Aug. 25, 1970  NAGASHIGE TAKAHASHI  3,525,561
DEVICE FOR INDICATING THE ORIENTATION OF THE IMAGE
OF AN OBJECT IN A FIBER OPTICAL SYSTEM
Filed Oct. 10, 1968

INVENTOR
NAGASHIGE TAKAHASHI
BY Kurt Kelman
AGENT

United States Patent Office

3,525,561
Patented Aug. 25, 1970

3,525,561
DEVICE FOR INDICATING THE ORIENTATION OF THE IMAGE OF AN OBJECT IN A FIBER OPTICAL SYSTEM
Nagashige Takahashi, Tokyo, Japan, assignor to Olympus Optical Company, Ltd., Tokyo, Japan
Filed Oct. 10, 1968, Ser. No. 766,468
Int. Cl. G02b 5/16
U.S. Cl. 350—96     6 Claims

ABSTRACT OF THE DISCLOSURE

Device for indicating the orientation of the image of an object in a fiber optical system comprising an objective lens, an elongated flexible optical fiber bundle located behind the objective lens for transmitting the image of the object formed by the objective lens system therethrough, and an ocular located behind the objective lens for viewing the thus transmitted image therethrough. The device comprises a reference index mark at a predetermined position on the forward end surface of the optical fiber bundle and a small particle-like member located in front of the forward end surface of the optical fiber bundle freely movably by the action of gravity over the entire area thereof with the particle-like member being held close to the forward end surface of the optical fiber bundle thereby permitting the orientation of the image of the object as viewed by the fiber optical system to be sensed by observing the position of the image of the particle-like member formed on the rearward end surface of the optical fiber bundle relative to the position of the image of the reference index mark irrespective of the twisting of the optical fiber bundle.

BACKGROUND OF THE INVENTION

The present invention relates to a device for indicating the orientation of the image of an object in a fiber optical system comprising an elongated flexible optical fiber bundle.

A fiber optical system such as an endoscope comprising an objective lens and an elongated flexible optical fiber bundle together with an ocular has been advantageously used in inspecting hollow portions in a living body by system comprising an elongated flexible optical fiber bundle. However, the optical fiber bundle tends to be twisted during the inspection of the hollow portions by using the fiber optical system because of its greater length in comparison with the diameter thereof, thereby making it difficult to exactly determine the orientation of the object which is viewed through the fiber optical system because the orientation of the image of the object varies as the optical fiber bundle is twisted. This causes serious disadvantages in the inspection of the hollow portions of the living body, for example, there might occur erroneous insertion of the forward end of the fiber optical system into an undesired portion of bronchi due to the misunderstanding of the orientation of the object caused by the twisting of the optical fiber bundle in case the fiber optical system is used for inspection of the bronchi.

The present invention aims at avoiding the above described disadvantages of the prior art fiber optical system and providing a novel and useful fiber optical system therefor by incorporating therein a device for indicating the orientation of the image of the object as viewed through the fiber optical system irrespective of the twisting of the optical fiber bundle thereby permitting the actual orientation of the object to be sensed.

SUMMARY OF THE INVENTION

It is an object of the present invention to provide a device for indicating the orientation of the image of an object in a fiber optical system irrespective of the twisting of the optical fiber bundle incorporated in the fiber optical system so that the actual orientation of the object is determined so as to prevent the erroneous operation of the fiber optical system.

The object of the present invention is achieved in accordance with the present invention by providing in a fiber optical system, which comprises an objective lens, an elongated flexible image transmitting optical fiber bundle with its forward end surface being located behind the objective lens so as to focus the image of an object thereon, and an ocular located behind the rearward end surface of the optical fiber bundle for viewing the image of the object transmitted to the rearward end surface of the optical fiber bundle, a reference index mark at a predetermined position on the forward end surface of the optical fiber bundle and a small particle-like member freely movable over the entire area of the forward end surface of the optical fiber bundle by the action of gravity with the particle-like member held close to the forward end surface of the optical fiber bundle, so that the orientation of the image of the object transmitted to the rearward end surface thereof can be sensed by observing the position of the image of the particle-like member transmitted to the rearward end surface of the optical fiber bundle determined by the action of gravity relative to that of the image of the reference index mark transmitted to the rearward end surface of the optical fiber bundle irrespective of the twisting of the optical fiber bundle.

The particle-like member may be made of a small steel ball or a small mercury ball, and the particle-like member is freely movably confined in a small thin chamber formed by the forward end surface of the optical fiber bundle, a thin transparent plate such as glass plate located in front of the forward end surface of the optical fiber bundle a short distance spaced therefrom in parallel relation thereto and a wall surrounding the circumferences of both the forward end surface of the optical fiber bundle and the thin transparent plate so that the small thin chamber extends transversely to the optical axis of the forward end of the optical fiber bundle over the entire area thereof.

With the construction of the present invention as described above, the image of the particle-like member located at the lowermost position on the rearward end surface of the optical fiber bundle by the action of gravity is located in a predetermined relationship relative to the image of the reference index mark on the rearward end surface of the optical fiber bundle when the fiber optical system is used in substantially horizontal position with the optical fiber bundle being held in non-twisted position. When the optical fiber bundle is twisted for some reasons during the operation of the fiber optical system, then the particle-like member is moved to the lowermost position in the small thin chamber by the action of gravity with the particle-like member being held close to the forward end surface of the optical fiber bundle so that the position of the image of the particle-like member on the rearward end surface thereof is varied in response to the twisting of the optical fiber bundle while the position of the image of the reference index mark is kept stationary on the rearward end surface of the optical fiber bundle thereby varying the relative positions between the two images. The variation in the relative positions of the two images indicates the amount of the twisting of the optical fiber bundle thereby permitting the orientation of the object to be determined irrespective of the twisting of the optical fiber bundle.

Since the operation of an endoscope is in almost all cases carried out in the position of the patient with his face upward and the endoscope extends substantially horizontally, the fiber optical system incorporating the present invention is very useful for such an endoscope.

The present invention is also useful in a fiber optical system by which an object located laterally or obliquely at the side of the optical axis of the objective lens is viewed by the provision of a light reflecting means at the forward end of the fiber optical system. In this case, the direction of the object being viewed by the fiber optical system radially outwardly of the optical axis of the objective lens can be determined by observing the relative positions of the images of the reference index mark and the particle-like member on the rearward end surface of the optical fiber bundle.

The present invention is not limited for use in the inspection of hollow portions of a living body but it can be applicable in any field of industry and the like, insofar as the fiber optical system is used in substantially horizontal position.

BRIEF DESCRIPTION OF THE DRAWINGS

FIGS. 1 and 2 are schematic views showing the relationship between the object and the images thereof formed on both end surfaces of an optical fiber bundle of the fiber optical system, FIG. 1 showing the relation when the optical fiber bundle is held in non-twisted position, while FIG. 2 shows the relation when the optical fiber bundle is twisted;

FIGS. 3 and 4 are schematic views showing the relationship between the two images of an object respectively formed on the forward and rearward end surfaces of the optical fiber bundle of the fiber optical system incorporating the device for indicating the orientation of the image of the object constructed in accordance with the present invention, FIG. 3 showing the condition in which the optical fiber bundle is kept in non-twisted state, while FIG. 4 shows the condition in which the optical fiber bundle is twisted.

DETAILED DESCRIPTION OF THE PREFERRED EMBODIMENTS

Prior to the description of the present invention, the prior art fiber optical system will be briefly set forth with reference to FIGS. 1 and 2 for the better understanding of the present invention.

Figure 1:
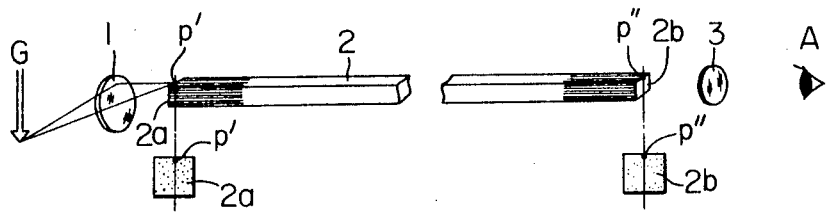

In FIG. 1, the fiber optical system comprises an objective lens 1, an elongated flexible image transmitting optical fiber bundle 2 with its forward end surface 2a being located behind the objective lens 1 in coaxial relationship thereto and an ocular 3 located behind the rearward end surface 2b of the optical fiber bundle 2 in coaxial relationship thereto. The cross-sectional configuration of the optical fiber bundle may be made to any shape other than square shape as shown. Thus, the image of an object G located in front of the objective lens 1 is formed on the forward end surface 2a, and the thus formed image of the object is transmitted through the optical fiber bundle 2 to the rearward end surface 2b thereof. The image on the rearward end surface 2b is viewed through the ocular 3 by the eye A of an operator. In FIG. 1, the optical fiber bundle 2 is in non-twisted position. Therefore, the point of the object G forms the image thereof at point p' on the forward end surface 2a, and the image p' is transmitted through the optical fiber bundle to the rearward end surface 2b thereof without being rotated about the longitudinal axis of the optical fiber bundle 2, so that the image of the point of the object G is formed at point p'' on the rearward end surface 2b. As shown, the orientation of the image p' is the same with that of the image p'', insofar as the optical fiber bundle is held in non-twisted state.

Figure 2:
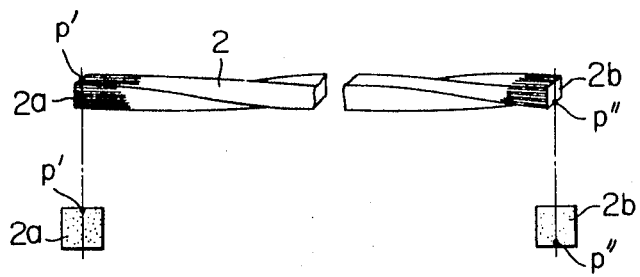

However, when the optical fiber bundle 2 is twisted for some reason during the operation of the fiber optical system as shown in FIG. 2, then the orientation of the image p'' varies according to the amount of the twisting of the optical fiber bundle 2. In FIG. 2, the optical fiber bundle 2 is shown as being twisted by 180° so that the image p'' is in the lowermost position whereas the image p' is in the uppermost position.

If means for detecting the twisting of the optical fiber bundle is not provided, it is impossible for the operator to determine the orientation of the object when the fiber optical system is used for inspecting the hollow portion and the optical fiber bundle is twisted. This might cause the erroneous inspection or diagnosis in the operation.

Now, the present invention will be described with reference to FIGS. 3 and 4.

Figure 3:
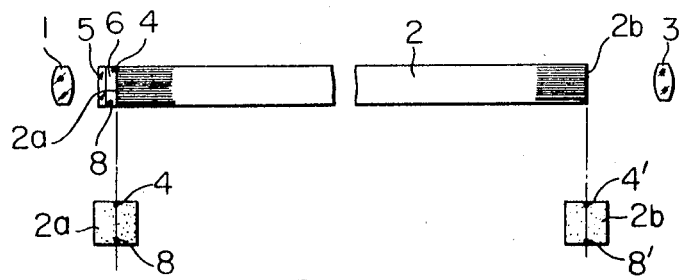
Figure 4:
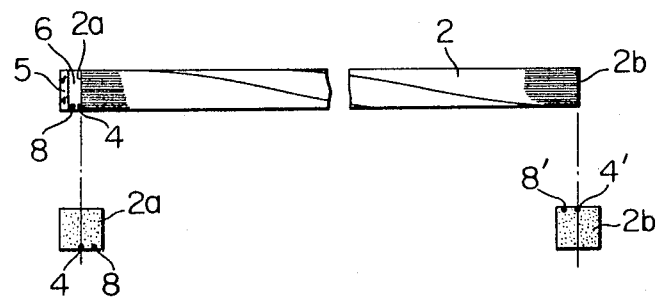

In FIGS. 3 and 4, the fiber optical system is similar to that shown in FIGS. 1 and 2.

However, in accordance with the present invention, a reference index mark 4 is provided at a predetermined position on the forward end surface 2a of the optical fiber bundle 2. In FIG. 3, the reference index mark 4 is located at the uppermost center position when the optical fiber bundle 2 is in non-twisted position. Therefore, the image 4' of the reference index mark 4 is formed on the rearward end surface 2b at the uppermost center position thereof.

Further, a thin transparent plate such as glass plate 5 is located in front of and parallel to the forward end surface 2a a short distance spaced therefrom, and circumferential wall means is provided so as to surround the circumferences of the thin transparent plate 5 and the forward end surface 2a so that a small thin chamber 6 is formed extending transverse to the optical axis over the entire area of the forward end surface 2a.

A small particle-like member 8 such as a small steel ball or a small mercury ball is freely movably confined within the small thin chamber 6 so that the particle-like member 8 is moved toward the lowermost position in the small chamber 6 by the action of gravity with the particle-like member 8 kept close to the forward end surface 2a because of the thin configuration of the small chamber 6.

In FIG. 3, the fiber optical system is shown in a horizontal position with the direction of the action of gravity directed to the lower side in the drawing, and the image 8' of the particle-like member 8 is formed at the lowermost position on the rearward end surface 2b, because the particle-like member 8 is located at the lowermost position in the small chamber 6 by the action of gravity.

Therefore, the image 8' of the particle-like member 8 is located at the opposite side to the image 4' of the reference index mark 4. This shows that the forward end of the optical fiber bundle 2 is located in the non-twisted position when the rearward end thereof is located in the normal position as shown in FIG. 3, so that the orientation of the object is sensed by observing the position of the image 8' relative to the image 4' of the reference index mark 4. The relative positions of both the images do not change even though the rearward end of the optical fiber bundle 2 is twisted insofar as the position of the forward end thereof is held unchanged with respect to the object.

When the forward end of the optical fiber bundle 2 is twisted for some reasons during the operation of the fiber optical system as shown in FIG. 4 (in FIG. 4, the optical fiber bundle 2 is shown as being twisted by 180°), then the image of the object transmitted to the rearward end surface 2b of the optical fiber bundle 2 is rotated about the optical axis thereof relatively to that as viewed when the optical fiber bundle 2 is in non-twisted position. Since the reference index mark 4 is moved together with the twisting of the forward end of the optical fiber bundle 2 while the particle-like member 8 is held at all times at the lowermost position in the small chamber 6, the relative positions of the images 4', 8' are changed in response to the twisting of the forward end of the optical fiber bundle as seen in FIG. 4. Therefore, the twisting of the forward end of the optical fiber bundle 2 relative to the object is detected by the change in the relative positions of the images 4' and 8'. Thus, the actual orientation of the object is sensed by observing the relative positions of the images 4', 8' even though the orientation of the image of the object on the rearward end surface 2b varies in response to the twisting of the forward end of the optical fiber bundle 2.

The present invention is also applicable to a fiber optical system by which an object located laterally of the optical axis thereof is viewed by the provision of light reflecting means. In this case, the direction of the object which is being inspected radially of the optical axis is sensed by observing the relative positions of the images 4' and 8'.

I claim:
1. Device for indicating the orientation of the image of an object in a fiber optical system comprising an objective lens, an elongated flexible image transmitting optical fiber bundle for transmitting the image focused on the forward end surface thereof by means of said objective lens through said optical fiber bundle to the rearward end surface thereof, and an ocular for viewing the image thus transmitted to the rearward end surface of said optical fiber bundle, wherein the improvement comprises a reference index mark provided at a predetermined position on the forward end surface of said optical fiber bundle, a small thin chamber provided in front of the forward end surface of said optical fiber bundle adjacent thereto and extending substantially transversely to the optical axis of the forward end of said optical fiber bundle over the entire area of the forward end surface thereof and a small particle-like member freely movably located within said small thin chamber by the action of gravity, thereby permitting the orientation of the image of the object as viewed through said ocular with respect to the actual orientation of the object to be sensed by observing through said ocular the position of the image of said particle-like member relative to that of the image of said reference index mark each formed on the rearward end surface of said optical fiber bundle irrespective of the twisting of said optical fiber bundle.

2. Device according to claim 1, wherein said small thin chamber is formed by a transparent thin plate located in front of the forward end surface of said optical fiber bundle in spaced relationship therefrom substantially parallel thereto, said forward end surface of said optical fiber bundle and wall means surrounding the circumference of said transparent thin plate and said forward end surface of said optical fiber bundle.

3. Device according to claim 1, wherein said reference index mark is located at a position on the forward end surface of said optical fiber bundle so that the image thereof is viewed at the uppermost position on the rearward end surface of said optical fiber bundle, thus the image of said particle-like member is viewed at the lowermost position on the rearward end surface of said optical fiber bundle when the fiber optical system is used in substantially horizontal position with said optical fiber bundle being held in non-twisted position.

4. Device according to claim 1, wherein said fiber optical system is of the type by which an object located at the side of the forward end of the fiber optical system laterally with respect to the optical axis thereof is viewed, and said reference index mark is located at a position on the forward end surface of said optical fiber bundle so that the image of said index reference mark on the rearward end surface of said optical fiber bundle is located at the uppermost position thereof, thereby permitting the orientation of the object with respect to the fiber optical sysem to be sensed by observing the position of the image of said particle-like member on said rearward end surface of said optical fiber bundle relative to said image of the reference index mark on the rearward end surface of said optical fiber bundle irrespective of the twisting of said optical fiber bundle.

5. Device according to claim 1, wherein said particle-like member is made of a small steel ball.

6. Device according to claim 1, wherein said particle-like member is a small mercury ball.

References Cited

UNITED STATES PATENTS 2,286,810   6/1942   Ingels.
3,010,357   11/1961  Hirschowitz.
3,221,593   12/1965  Ferris.

DAVID H. RUBIN, Primary Examiner

U.S. Cl. X.R.

128—4; 350—10; 356—241